United States Patent [19]

Girardi et al.

[11] 4,379,347
[45] Apr. 5, 1983

[54] RECEIVER FOR PCM-ENCODED MULTIFREQUENCY DIALING SIGNALS

[75] Inventors: Guglielmo Girardi, San Mauro Torinese; Franco Miroglio, Turin, both of Italy

[73] Assignee: Cselt - Centro Studi e Laboratori Telecomunicazioni S.p.A., Turin, Italy

[21] Appl. No.: 203,459

[22] Filed: Nov. 3, 1980

[30] Foreign Application Priority Data

Nov. 5, 1979 [IT] Italy .................... 69149 A/79

[51] Int. Cl.³ .................................... H03K 13/01
[52] U.S. Cl. ............................. 375/94; 179/84 VF
[58] Field of Search ................. 375/25.75, 94.96; 179/16 EC, 84 VF, 18 EB

[56] References Cited

U.S. PATENT DOCUMENTS 4,100,378  7/1978  Claasen et al. ............ 375/96
4,185,172  1/1980  Melindo .................... 375/96
4,242,755  12/1980  Gavzan .................... 375/94

OTHER PUBLICATIONS

"A Digital Receiver for Multifrequency Signals from Pushbutton Telephone Sets" by Melindo et al., Jun. 1978.

*Primary Examiner*—Jin F. Ng
*Attorney, Agent, or Firm*—Karl F. Ross

[57] ABSTRACT

To decode multifrequency dialing signals transmitted by a pushbutton-equipped subscriber station of a telecommunication system and quantized upon arrival at a central office, a receiver at the office includes two digital filters separating the incoming binary-coded samples from sine waves in a higher and a lower frequency range and supplying the respective sets of samples to two interpolators converting them into respective square waves fed to a decoder. Each interpolator comprises a sign-bit extractor and an arithmetic unit which emits a numerical value—based on the absolute values of two consecutive samples—representing a delay expressed as a number of clock pulses recurring at a multiple of the sampling rate. A logic network responds to a polarity change of the corresponding sine wave, as determined by the sign-bit extractor, to start a clock-pulse counter measuring a corrective time interval by which the resulting square wave must be delayed so that its pulse flanks substantially coincide with the zero crossings of the sine wave shifted by one sampling period. The delay is accomplished by an Exclusive-OR gate with inputs connected to the logic network and to the sign-bit extractor.

5 Claims, 5 Drawing Figures

RECEIVER FOR PCM-ENCODED MULTIFREQUENCY DIALING SIGNALS

FIELD OF THE INVENTION

Our present invention relates to a receiver for periodically receiving quantized signal samples derived from sine waves of different frequencies that are to be converted into numerical information, such as call-number digits of a subscriber station in a telephone or other telecommunication system.

BACKGROUND OF THE INVENTION

Dialing signals generated by pushbutton-equipped telephone sets are generally transmitted as sine waves of different frequencies serving to indicate selected digits. In central offices operating with pulse-code modulation (PCM), the incoming voice frequencies are often sampled and digitized before being routed to their destinations. In these cases, therefore, sine waves generated by a pushbutton selector undergo the same quantizing process.

A receiver for such multifrequency-coded digitized signals has been disclosed in commonly owned U.S. Pat. No. 4,185,172 (Melindo et al).

Conventional central-office equipment designed to handle analog multifrequency signals converts incoming sine waves into square waves that can be decoded by logical circuitry which translates their frequencies into the numerical information needed for completing the call. Such equipment, however, cannot be readily utilized with quantized signal samples including the usual predetermined number of amplitude bits accompanied by a sign bit. Although a change in sign bit from one sample to the next indicates that the corresponding sine wave has undergone a zero crossing within the sampling period immediately preceding the detection of that change, a square wave with rising and falling pulse flanks occurring at the instants of the detected sign-bit changes would not be completely in step with the underlying square wave. Since the delay occurring between a zero crossing and a corresponding pulse flank could range from zero to an entire sampling period, and since that sampling period cannot be arbitrarily reduced in a PCM system, the square wave will experience significant phase shifts which may interfere with decoding.

OBJECTS OF THE INVENTION

The general object of our present invention, therefore, is to provide means in a receiver of the type referred to for minimizing the phase shifts liable to occur between the zero crossings of a sine wave and the pulse flanks of a square wave derived from quantized samples thereof.

A more particular object of our invention is to provide circuitry for this purpose which readily lends itself to a large-scale monolithic integration.

SUMMARY OF THE INVENTION

A receiver according to our invention comprises a sign-bit extractor inserted between an incoming-signal path and logical circuitry designed to convert sign-bit changes of consecutive signal samples into pulse flanks of a square wave as discussed above, the logical circuitry being connected to the incoming-signal path by way of interpolation means controlled by the sign-bit extractor for establishing a corrective time interval serving to compensate for the aforementioned phase shifts. This time interval is determined by the values of two consecutive signal samples with different sign bits, the logical circuitry causing the generation of a pulse flank to be delayed by that interval beyond the instant of appearance of the second one of these two consecutive samples whereby the generated pulse flank follows the corresponding zero crossing by substantially a whole sampling period. A decoder also connected to the logical circuitry converts the resulting square wave into numerical information.

Pursuant to a more particular feature of our invention, the interpolation means may comprise a digital store such as a parallel register for delaying incoming signal samples by one sampling period, an arithmetic unit with inputs respectively connected to an input and to an output of that store for deriving from amplitude bits of an undelayed and a delayed sample a ratio approximately proportional to the fraction of a sampling period elapsed between the first of the consecutive samples with different sign bits and the corresponding zero crossing, and timing means connected to this unit for translating that ratio into the corrective time interval. The timing means may comprise a counter stepped by clock pulses whose recurrence period is a small fraction of a sampling period.

Advantageously, the incoming-signal path includes digital filter means for directing signal samples from sine waves in different frequency ranges to a plurality of branch paths leading to the decoder, each branch path including a sign-bit extractor, logical circuitry and interpolation means as described above. This allows the use of a decoder divided into several sections of limited dynamic range.

BRIEF DESCRIPTION OF THE DRAWING

The above and other features of our invention will now be described in detail with reference to the accompanying drawing in which:

FIG. 3 is a truth table relating to the operation of a logic network included in the interpolator of FIG. 2;

FIG. 5 is an explanatory curve diagram.

SPECIFIC DESCRIPTION

Figure 1:
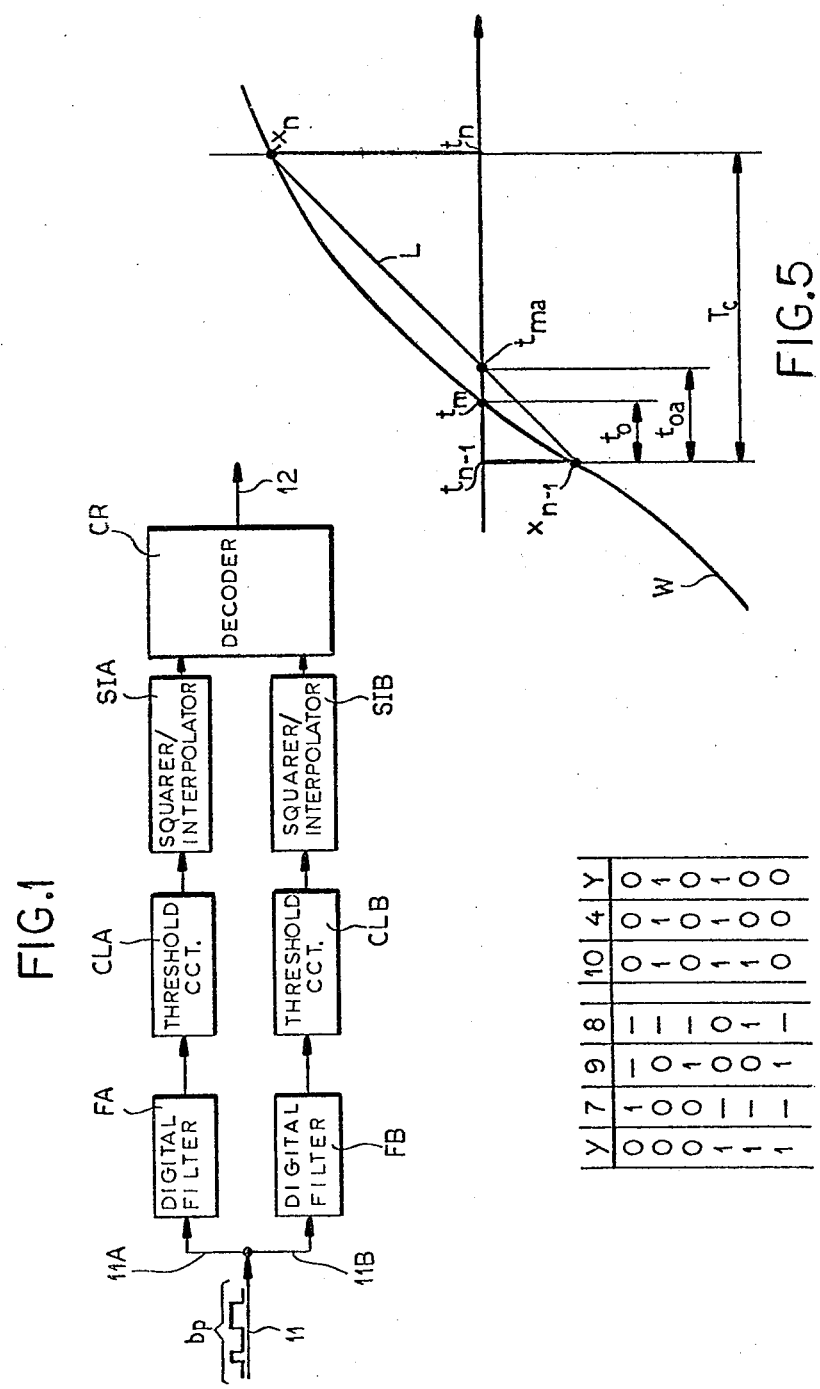
FIG. 1 is an overall block diagram of a signal receiver according to our invention.

In FIG. 1 we have shown a receiver in a central office of a telephone system to which quantized signal samples bp are fed from an associated subscriber station by way of an incoming-signal path 11 after passing through a nonillustrated sampling and digitizing unit. Signal path 11 is split into two branches 11A and 11B each including a digital filter FA, FB, a threshold circuit CLA, CLB and a squarer/interpolator SIA, SIB feeding a common decoder CR. A line 12 extending from that decoder carries numerical information into which the incoming signals have been converted. Decoder CR may be of the type described in the above-identified patent to Melindo et al.

Filters FA and FB are of conventional type designed to pass two different ranges of signal frequencies, specifically lower frequencies from 697 Hz to 941 Hz in the case of filter FA and from 1209 Hz to 1633 Hz in the case of filter FB. Thus, each branch path may be designed to handle encoded PCM samples of five different signal frequencies used for pushbutton dialing.

Reference may be made to an article by Flavio Melindo et al titled "DIGITAL RECEIVER FOR MULTIFREQUENCY SIGNALS FROM PUSHBUTTON TELEPHONE SETS", published June 1978 by our assignee in CSELT RAPPORTI TECNICI, pp. 105–111, Vol. 6, No. 2, for a description of such filters.

Threshold circuits CLA and CLB discriminate against low-level pulses, e.g. in conformity with the regulations of the European Postal and Telecommunications Commission (CEPT). The quantized samples passed on to components SIA and SIB may be the usual 8-bit words with one sign bit followed by seven amplitude bits. The sampling rate may be 8 kHz corresponding to a sampling period $T_c = 125\mu$.

Figure 2:
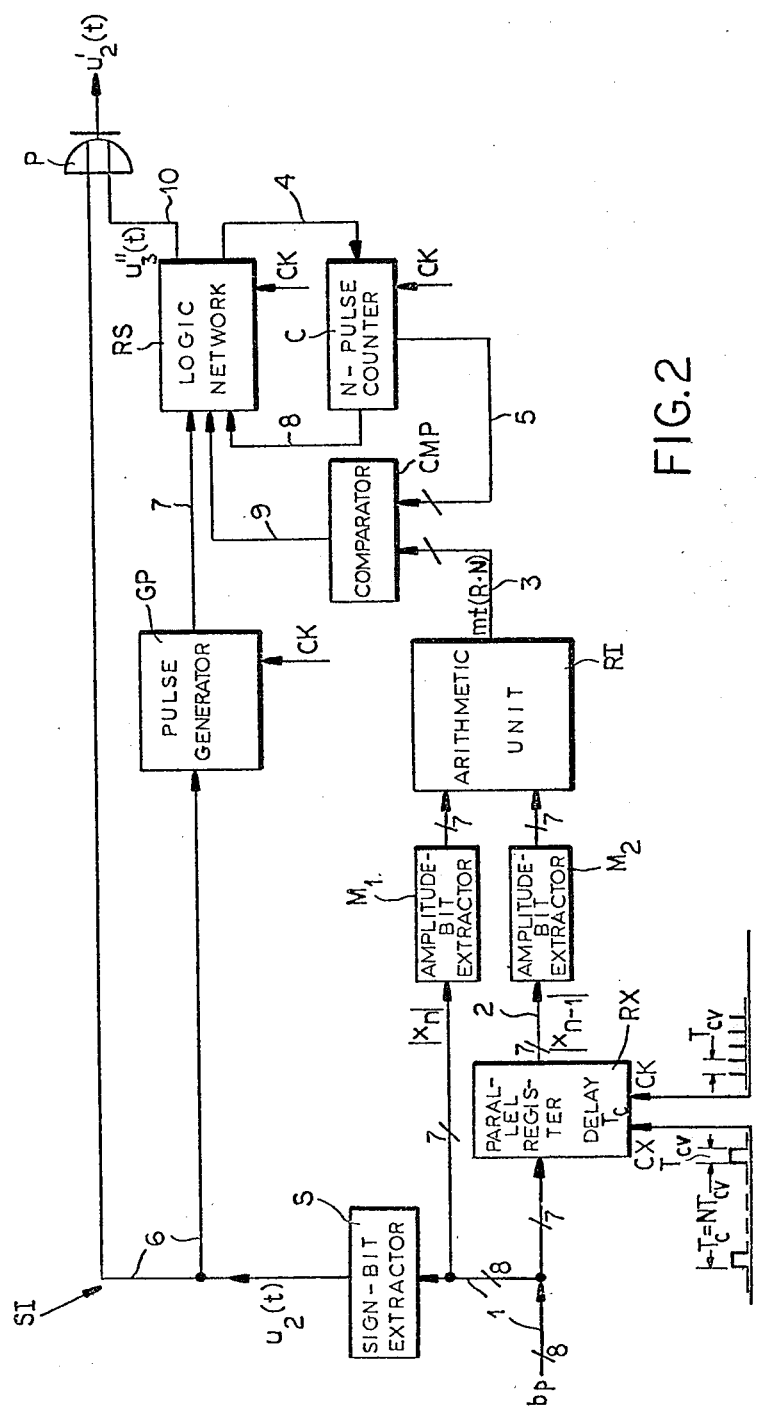
FIG. 2 is a more detailed block diagram of an interpolator forming part of the receiver of FIG. 1.

The two squaring and interpolating components SIA and SIB are mutually identical and conform to the circuit arrangement designated SI in FIG. 2. Component SI has an 8-lead input multiple 1, carrying incoming signal samples bp from the preceding digital filter (FIG. 1).

The lead of multiple 1 carrying the incoming sign bit extends to a sign-bit extractor S while the other seven leads, carrying the amplitude bits, terminate at an amplitude-bit extractor $M_1$ and in parallel therewith at respective stages of a register RX delaying their passage by one sampling period $T_c$. Register RX is controlled by loading pulses CX, extracted from the incoming bit stream and thus recurring with sampling period $T_c$, and by locally generated clock pulses CK whose cadence is N times that of pulses CX (with $N \gg 1$) and whose cycle $T_{cv}$, equaling the width of a loading pulse CX, corresponds therefore to $T_c/N$. The presence of a pulse CX enables register RX to store the seven amplitude bits of an incoming code word which thereupon appear on its 7-lead output multiple 2 until the occurrence of the next loading pulse.

Multiple 2 terminates at another amplitude-bit extractor $M_2$ similar to extractor $M_1$, the two extractors feeding an arithmetic unit RI. An output multiple 3 of that unit extends to a comparator CMP having another input connected to an output multiple 5 of an N-pulse counter C stepped by clock pulses CK.

Sign-bit extractor S has an output lead 6 extending on the one hand to an input of an Exclusive-OR (XOR) gate P and on the other hand to a pulse generator GP also controlled by clock pulses CK. A logic network RS has three input leads 7, 8 and 9, respectively originating at pulse generator GP, counter C and comparator CMP, and two leads 4 and 10 respectively terminating at an enabling input of counter C and at a second input of XOR gate P.

Arithmetic unit RI receives the amplitude bits representing the absolute magnitude of an undelayed sample $x_n$ from extractor $M_1$ and of a delayed sample $x_{n-1}$ from extractor $M_2$ to derive therefrom a numerical value corresponding to the integral part int(R·N) of the product R·N where R is a ratio given by $$R = [|x_{n-1}|/(|x_n| + |x_{n-1}|)]$$

whose significance will become clear from the subsequent description of FIG. 5. The sign bits fed to extractor S have the logical value "1" when the sampled sine wave has positive or zero amplitudes; with negative amplitudes that logical value is "0". Extractor S, therefore, maintains its output lead 6 energized during positive half-cycles of that sine wave and de-energized during negative half-cycles thereof, yet the transitions between high and low output voltage generally do not exactly coincide with the zero crossings of the wave in view of the phase shifts referred to above. Pulse generator GP, acting as a zero-crossing detector, briefly de-energizes its normally energized output lead 7 for the duration of a clock pulse CK in response to any such transition.

Logic network RS, responding to low voltage on lead 7 as more fully described hereinafter with reference to the truth table shown in FIG. 3, emits an enabling signal via lead 4 to pulse counter C which energizes its output lead 8 upon reaching its full count N. When the comparator CMP detects a match between the reading of counter C and the numerical value int(R·N) emitted by unit RI, it energizes its output lead 9 to restore the logic network RS to its normal inactive state, thereby terminating the enabling signal on lead 4 and resetting the counter C. Network RS, which also receives the clock pulses CK, emits a corrective pulse to XOR gate P by way of lead 10 for a time interval measured by counter C between resettings thereof.

In FIG. 3 the first column labeled y represents an initial state of logic network RS while the last column labeled Y represents a possibly modified state resulting from a voltage change in one or more of its input leads. The intervening columns labeled 4, 7, 8, 9 and 10 show the logical values "0" and "1" of the signals appearing on the corresponding leads. Short dashes denote indifference ("don't care").

From the top row of FIG. 3 it will be apparent that the inactive state "0" of network RS does not change as long as lead 7 carries a signal "1", indicating the absence of a sign change. When such a sign change occurs, as shown in the second row, network RS switches from an initially inactive state (y=0) to an active state (y=1) and energizes both its output leads 4 and 10, provided that comparator output 9 carries the signal "0" to indicate that numerical value int(R·N) read out from unit RI on multiple 3 differs from the reading of pulse counter C appearing on multiple 5, the counter being reset at that time. If, however, the ratio R happens to be zero, comparator CMP emits a signal "1" which leaves network RS in its inactive state (Y=0) as indicated in the third row. When that network is initially in its active state (y=1), the voltage on lead 7 is immaterial and no change takes place as long as neither lead 8 nor lead 9 is energized as shown in the fourth row of FIG. 3. When lead 8 carries a signal "1" to indicate a full count, network RS returns to its inactive state (Y=0) and resets the counter C by de-energizing its lead 4 while maintaining the energization of lead 10 as seen in the fifth row; one clock cycle $T_{cv}$ later, full normalization occurs in accordance with the top row. The last row shows that, with y=1, the network is returned to its inactive state (Y=0) upon the energization of lead 9 indicating the detection of a match by comparator CMP.

Figure 4:
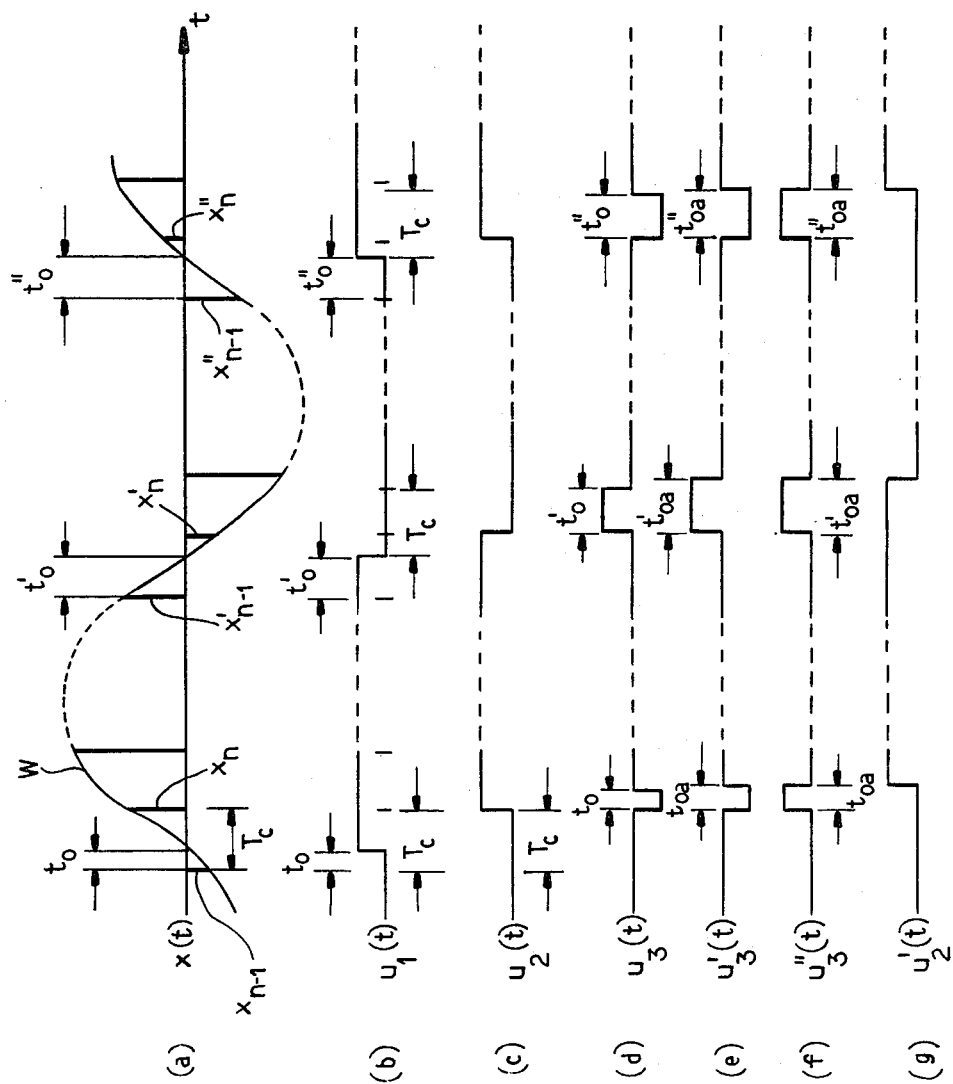
FIG. 4 is a set of graphs illustrating the mode of operation of that interpolator.

Graph (a) of FIG. 4 shows signal samples x(t) taken at various times, t, especially before and after a zero crossing of a sine wave W generated by the depression of a pushbutton of a subscriber station connected to line 11 of FIG. 1. The first sample $x_{n-1}$, which is of negative polarity, leads the instant of zero crossing by a time $t_o$ here assumed to be a minor fraction of a sampling period $T_c$. The next sample $x_n$, occurring one sampling period later, is of positive polarity. Similar lead times $t'_o$ and $t''_o$ have been indicated for further samples $x'_{n-1}$ and $x''_{n-1}$ preceding other zero crossings which are followed by samples $x'_n$ and $x''_n$ of the opposite polarities. Sampling period $T_c$, as shown, is considerably shorter than a half-cycle of sine wave W.

Graph (b) of FIG. 4 shows an ideal square wave $u_1(t)$ which would be generated by an analog-type squarer and whose pulse flanks coincide with the zero crossings of wave W. A square wave $u_2(t)$, shown in graph (c), appears on output lead 6 of sign-bit extractor S (FIG. 2) and has pulse flanks coinciding with samples $x_n$, $x'_n$, $x''_n$ etc.

It will be noted that the pulse durations of wave $u_2(t)$ differ significantly from those of wave $u_1(t)$.

In graph (d) of FIG. 4 we have shown a waveform $u_3(t) = u_1(t - T_c) - u_2(t)$ where $u_1(t - T_c)$ represents the wave $u_1(t)$ of graph (b) delayed by one sampling period $T_c$. Graph (e) shows a waveform $U'_3(t)$ obtained in a manner described hereinafter closely resembling waveform $u_3(t)$, yielding after rectification a waveform $u''_3(t)$ which has been illustrated in graph (f) and represents the corrective signal appearing on the output lead 10 of network RS (FIG. 2). XOR gate P combines the two waveforms $u_2(t)$ on lead 6 and $u''_3(t)$ on lead 10 into a square wave $u'_2(t)$, shown in graph (g) on FIG. 4, which closely resembles the delayed square wave $u_1(t - T_c)$.

Successive pulses of waveforms $u'_3(t)$ and $u''_3(t)$ shown in graphs (e) and (f) on FIG. 4 have widths designated $t_{oa}$, $t'_{oa}$, $t''_{oa}$ to indicate an approximation of the respective pulse widths $t_o$, $t'_o$ and $t''_o$ in graph (d). The basis of this approximation will become apparent from FIG. 5 which shows the curve W together with a straight line L interconnecting the peaks of samples $x_{n-1}$ and $x_n$. Curve W passes through zero at at time $t_m = t_{n-1} + t_o$ slightly offset from a time $t_{ma} = t_{n-1} + t_{oa}$ at which line L intersects the axis. The corrective interval $t_{oa}$ is given by the aforementioned ratio R times the sampling period $T_c = N \cdot T_{cv}$ and is thus measured by the number of steps taken by counter C in response to clock pulses CK. The detection of a sign change, at an instant $t_n$, follows the actual zero crossing at instant $t_m$ by an interval at most equal to period $T_c$.

If, with a negative-going zero crossing of wave W, the first sample $x_{n-1}$ happens to be 0, the output signal of unit RI on lead 3 matches the zero reading of counter C on lead 5 so that comparator CMP energizes lead 9. Thus, network RS immediately returns to normal (last row in FIG. 3) and counter C is not stepped. Waveform $u_2(t)$, whose falling flank then occurs exactly one sampling period $T_c$ after the zero crossing, conforms in that instance to waveform $u'_2(t) = u_1(t - T_c)$.

If, on the other hand, the second sample $x_n$ indicative of a polarity change coincides with a positive-going zero crossing, the numerical value emitted by unit RI will be equal to N with the result that counter C will reach its full count before comparator CMP energizes its output lead 9 whereby waveform $u'_2t$, conforming in this instance to the ideal square wave $u_1(t)$, is phase-shifted by an entire sampling period $T_c$.

It will be apparent that unit RI cannot generate numerical values higher than N and that comparator CMP should therefore detect a coincidence at some time during the stepping of counter C. If, however, comparator CMP fails for any reason to signal such coincidence before the full count N is reached, the counter will be reset after a whole sampling period as described above with reference to the fifth row of FIG. 3.

The components of our multifrequency-signal receiver can be conveniently realized with large-scale monolithic integration.

We claim:

1. A receiver for periodically recurring quantized signal samples of a sine wave, each signal sample occurring during a predetermined sampling period substantially shorter than a half-cycle of said sine wave and including a sign bit and a predetermined number of amplitude bits, comprising:
   a sign-bit extractor connected to an incoming-signal path for converting the sign bits of consecutive signal samples into a square wave with rising and falling pulse flanks subjected to delays of up to one sampling period with reference to an incoming sine wave;
   interpolation means including a zero-crossing detector controlled by said sign-bit extractor and further including amplitude-bit-extraction means connected to said incoming-signal path for establishing a corrective time interval equal to a fraction of a sampling period in response to any detected sign change, the magnitude of said fraction being determined by the values of two consecutive signal samples having different sign bits;
   logical circuitry connected to outputs of said sign-bit extractor and of said interpolation means for delaying by said time interval the generation of a pulse flank beyond the instant of appearance of the second one of said consecutive signal samples to separate the time of generation of such a pulse flank by substantially a whole sampling period from the occurrence of the corresponding zero crossing; and
   decoding means connected to said logical circuitry for converting said square wave into numerical information.

2. A receiver as defined in claim 1 wherein said amplitude-bit-extraction means comprises a first extractor directly connected to said incoming-signal path and a second extractor connected to said incoming-signal path via a digital store delaying incoming signal samples by one sampling period, said interpolation means further comprising an arithmetic unit with inputs respectively connected to outputs of said first and second extractors for deriving from amplitude bits of an undelayed and a delayed sample a ratio $R = |x_{n-1}|/(|x_n| + |x_{n-1}|)$, where $|x_n|$ is the absolute magnitude of the undelayed sample and $|x_{n-1}|$ is the absolute magnitude of the delayed sample, and timing means connected to said arithmetic unit for translating said ratio into said corrective time interval.

3. A receiver as defined in claim 2 wherein said timing means includes a source of N clock pulses per sampling period with $N \gg 1$, a counter steppable by said clock pulses, a comparator with inputs connected to said counter and to said arithmetic unit for detecting a match between the reading of said counter and a numerical value equal to the integral part of the product $R \cdot N$ emitted by said arithmetic unit, and a logic network responsive to said comparator and to said zero-crossing detector for activating said counter upon the occurrence of a sign change and generating a corrective signal as long as said reading differs from said numerical value.

4. A receiver as defined in claim 3 wherein said logical circuitry comprises an Exclusive-OR gate with inputs connected to said sign-bit extractor and to said logic network.

5. A receiver as defined in claim 1, 2, 3 or 4, further comprising digital filter means in said incoming-signal path for directing signal samples from sine wave in different frequency ranges to respective branch paths extending to said decoding means; said sign-bit extractor, logical circuitry and interpolation means being duplicated in all said branch paths.

* * * * *